(12) United States Patent
Stephan

(10) Patent No.: US 6,217,101 B1
(45) Date of Patent: Apr. 17, 2001

(54) VEHICLE WINDOW SHIELD SYSTEM

(76) Inventor: Max L. Stephan, P.O. Box 1066, West Seneca, NY (US) 14224

( * ) Notice: Subject to any disclaimer, the term of this patent is extended or adjusted under 35 U.S.C. 154(b) by 0 days.

(21) Appl. No.: 09/373,199

(22) Filed: Aug. 12, 1999

(51) Int. Cl.$^7$ .................................................. B60J 1/20
(52) U.S. Cl. .......................... 296/95.1; 296/39.1; 296/89
(58) Field of Search ................... 296/89, 146.15, 296/95.1, 39.1, 188; 49/61, 63, 65

(56) References Cited

U.S. PATENT DOCUMENTS

| | | | |
|---|---|---|---|
| 2,328,263 | * | 8/1943 | Stefano . |
| 2,854,282 | * | 9/1958 | Nichols . |
| 3,212,809 | * | 10/1965 | Johnston . |
| 4,773,697 | * | 9/1988 | Svensson . |
| 5,060,361 | * | 10/1991 | Grimes . |
| 5,165,188 | * | 11/1992 | Tsiros . |
| 5,324,090 | * | 6/1994 | Lehnhoff . |
| 5,469,662 | * | 11/1995 | TenBrink et al. . |
| 6,015,184 | * | 1/2000 | Ewing et al. . |

* cited by examiner

Primary Examiner—D. Glenn Dayoan
Assistant Examiner—Scott Carpenter

(57) ABSTRACT

A vehicle window shield system for preventing unauthorized access to the interior of a vehicle through the windows or windshields. The vehicle window shield system includes a plurality of flexible lining members adapted for positioning adjacent to an interior face of each window of a vehicle. Each lining member is retractable using a reversing motor and a pulley system coupled to the lining member. In an embodiment, a front lining member includes a central portion with side flanges inserted into slots of respective side portions. The side portions are pivotally coupled to the central portion and include slits in the side portions to permit positioning of the front lining member adjacent a curved window.

12 Claims, 5 Drawing Sheets

VEHICLE WINDOW SHIELD SYSTEM

BACKGROUND OF THE INVENTION

1. Field of the Invention

The present invention relates to window shields and more particularly pertains to a new vehicle window shield system for preventing unauthorized access to the interior of a vehicle through the windows or windshields.

2. Description of the Prior Art

The use of window shields is known in the prior art. More specifically, window shields heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,909,044; U.S. Pat. No. 5,751,488; U.S. Pat. No. 1,470,800; U.S. Pat. No. 4,824,160; U.S. Pat. No. 5,044,686; and U.S. Pat. No. Des. 370,650.

While these devices fulfill their respective, particular objectives and requirements, the aforementioned patents do not disclose a new vehicle window shield system. The inventive device includes a plurality of flexible lining members adapted for positioning adjacent to an interior face of each window of a vehicle. Each lining member is retractable using a reversing motor and a pulley system coupled to the lining member.

In these respects, the vehicle window shield system according to the present invention substantially departs from the conventional concepts and designs of the prior art, and in so doing provides an apparatus primarily developed for the purpose of preventing unauthorized access to the interior of a vehicle through the windows or windshields.

SUMMARY OF THE INVENTION

In view of the foregoing disadvantages inherent in the known types of window shields now present in the prior art, the present invention provides a new vehicle window shield system construction wherein the same can be utilized for preventing unauthorized access to the interior of a vehicle through the windows or windshields.

The general purpose of the present invention, which will be described subsequently in greater detail, is to provide a new vehicle window shield system apparatus and method which has many of the advantages of the window shields mentioned heretofore and many novel features that result in a new vehicle window shield system which is not anticipated, rendered obvious, suggested, or even implied by any of the prior art window shields, either alone or in any combination thereof.

To attain this, the present invention generally comprises a plurality of flexible lining members adapted for positioning adjacent to an interior face of each window of a vehicle. Each lining member is retractable using a reversing motor and a pulley system coupled to the lining member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle window shield system apparatus and method which has many of the advantages of the window shields mentioned heretofore and many novel features that result in a new vehicle window shield system which is not anticipated, rendered obvious, suggested, or even implied by any of the prior art window shields, either alone or in any combination thereof.

It is another object of the present invention to provide a new vehicle window shield system which may be easily and efficiently manufactured and marketed.

It is a further object of the present invention to provide a new vehicle window shield system which is of a durable and reliable construction.

An even further object of the present invention is to provide a new vehicle window shield system which is susceptible of a low cost of manufacture with regard to both materials and labor, and which accordingly is then susceptible of low prices of sale to the consuming public, thereby making such vehicle window shield system economically available to the buying public.

Still yet another object of the present invention is to provide a new vehicle window shield system which provides in the apparatuses and methods of the prior art some of the advantages thereof, while simultaneously overcoming some of the disadvantages normally associated therewith.

Still another object of the present invention is to provide a new vehicle window shield system for preventing unauthorized access to the interior of a vehicle through the windows or windshields.

Yet another object of the present invention is to provide a new vehicle window shield system which includes a plurality of flexible lining members adapted for positioning adjacent to an interior face of each window of a vehicle. Each lining member is retractable using a reversing motor and a pulley system coupled to the lining member.

Still yet another object of the present invention is to provide a new vehicle window shield system that protects a person positioned within the vehicle from outside dangers by permitting the person to position the protective lining members made of high strength material adjacent to the interior face of each window.

Even still another object of the present invention is to provide a new vehicle window shield system that provides a visual deterrent to potential theft by providing a visual barrier to the interior of the vehicle to mask the vehicle contents.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
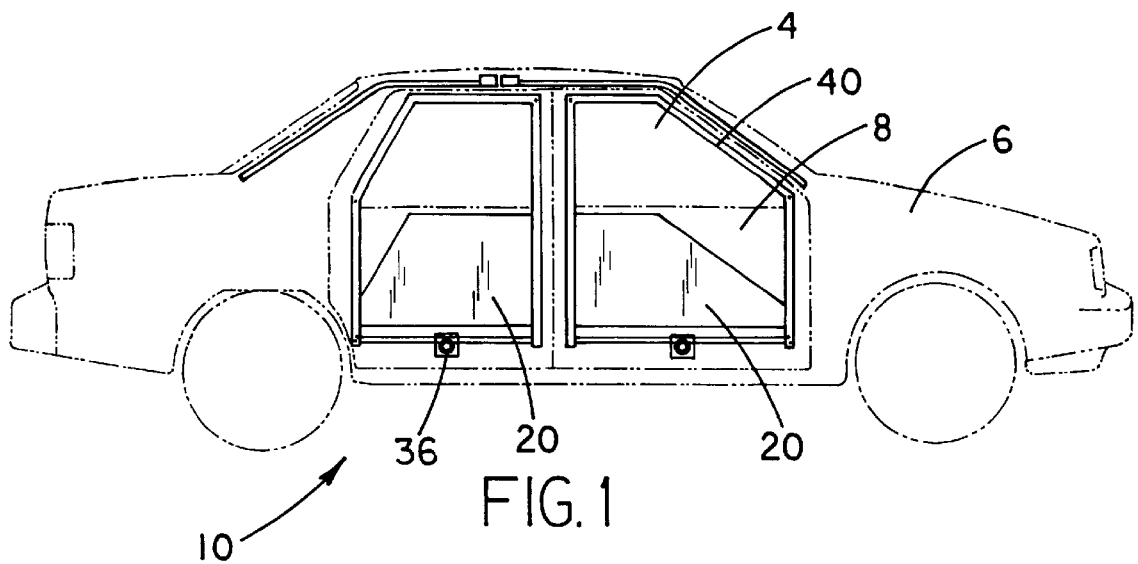
FIG. 1 is a schematic front view of a new vehicle window shield system according to the present invention.
Figure 2:
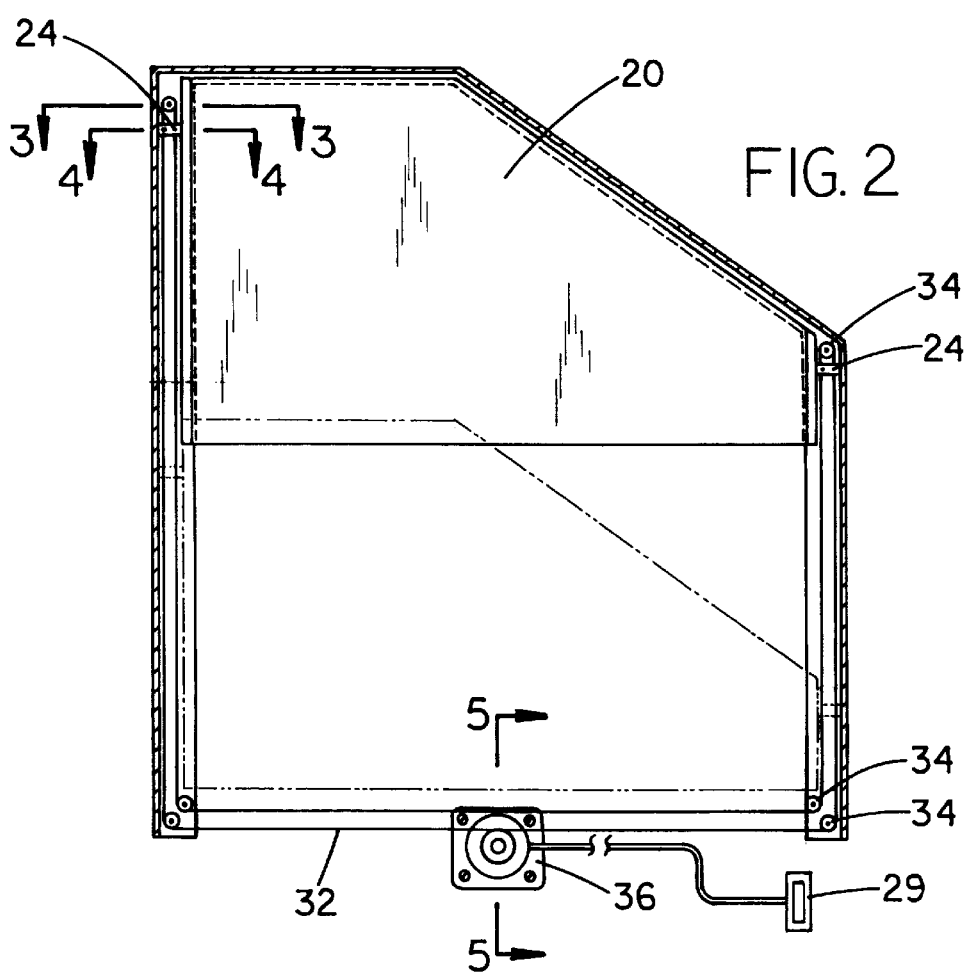
FIG. 2 is a schematic front view of the present invention.
Figure 3:
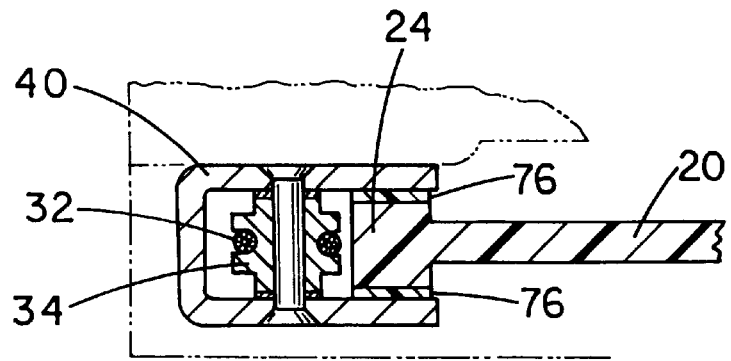
FIG. 3 is a schematic cross-sectional view of the present invention taken along line 3—3 in FIG. 2.
Figure 4:
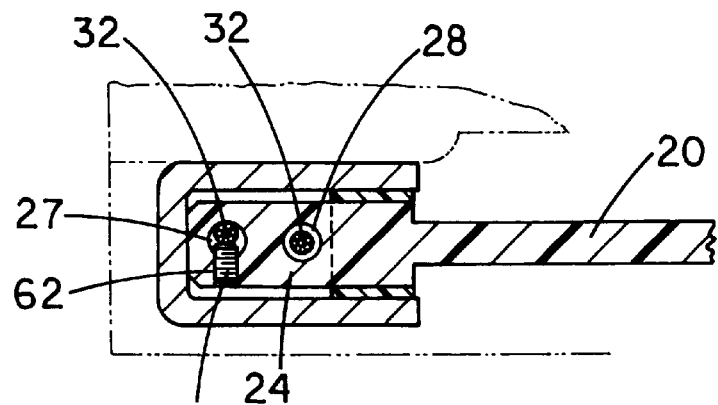
FIG. 4 is a schematic cross-sectional view of the present invention taken along line 4—4 in FIG. 2.
Figure 5:
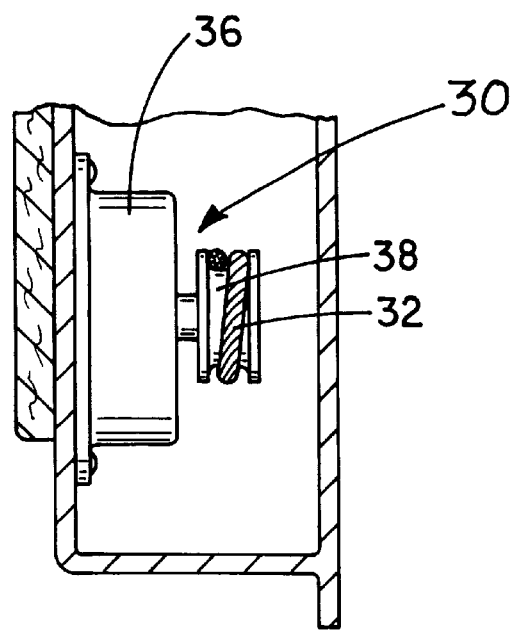
FIG. 5 is a schematic side view of the motor and drive pulley of the present invention.
Figure 6:
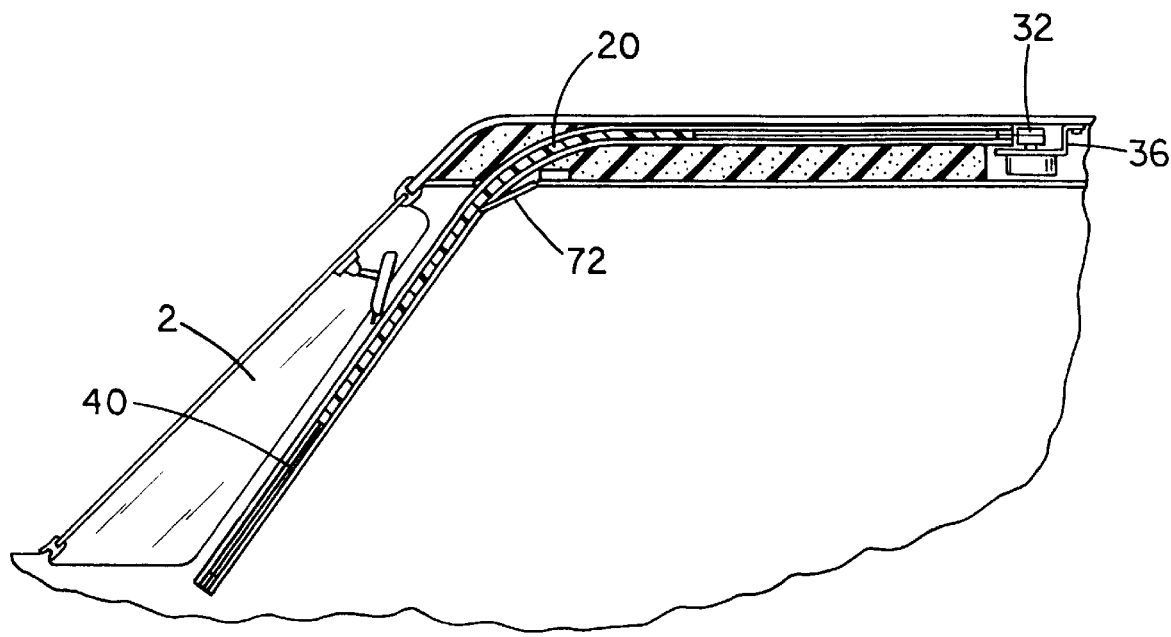
FIG. 6 is a schematic cross-sectional view of the front lining member assembly of the present invention.
Figure 7:
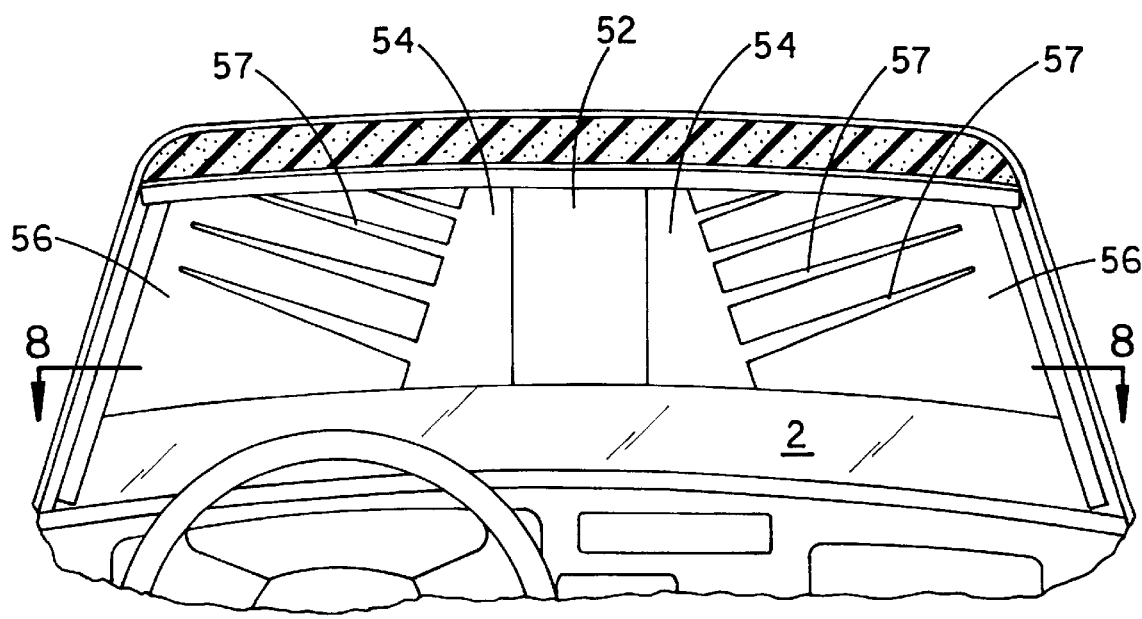
FIG. 7 is a rear view of the partially retracted front lining member.
Figure 8:
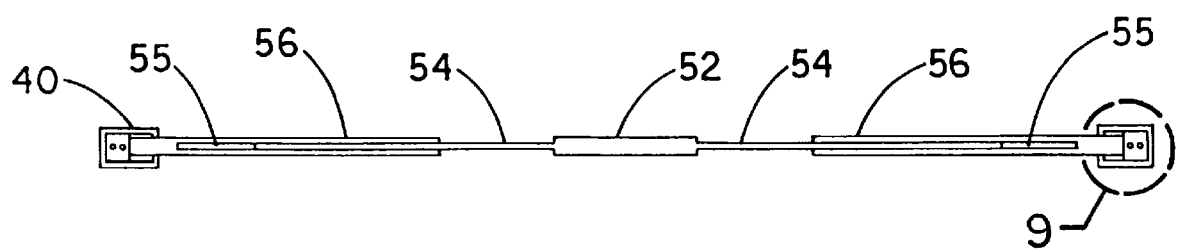
FIG. 8 is a cross-sectional view of the front lining member taken along line 8—8 of FIG. 7.

With reference now to the drawings, and in particular to FIGS. 1 through 6 thereof, a new vehicle window shield system embodying the principles and concepts of the present invention and generally designated by the reference numeral 10 will be described.

As best illustrated in FIGS. 1 through 6, the vehicle window shield system 10 generally comprises a plurality of protective retractable lining members 20 designed for selective positioning adjacent to a respective window 2 within the window opening 4 of a vehicle 6 such that the lining member provides a barrier between the window and an interior of the vehicle.

Each lining member is coupled to a pulley system 30 operationally for facilitating movement of the lining member between an extended position defined by the lining member being positioned adjacent to the window and a retracted position defined by the lining member being positioned within a lining member chamber 8 of the vehicle.

Figure 9:
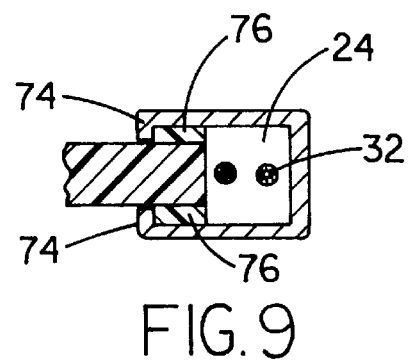
FIG. 9 is a cross-sectional view of the lining and track connection.
Figure 10:
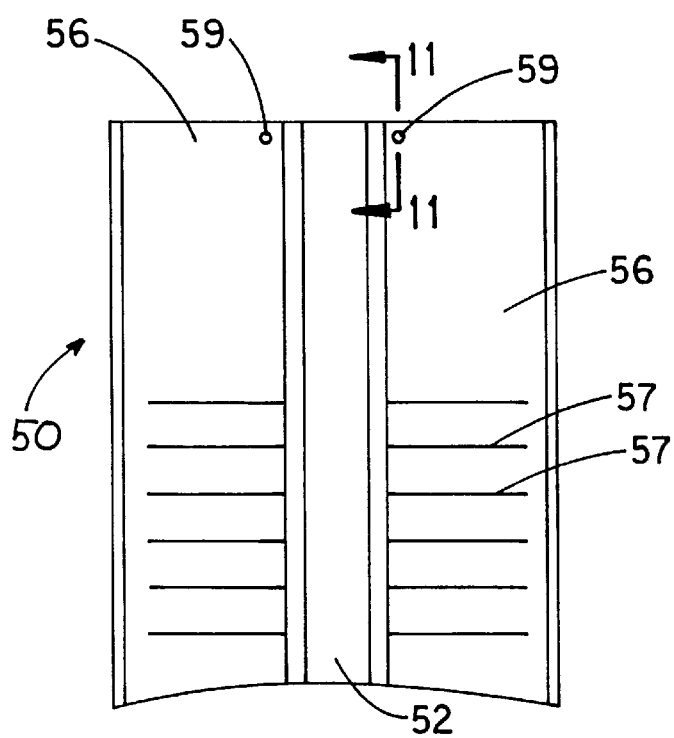
FIG. 10 is a view of the front lining member in a fully retracted position.
Figure 11:
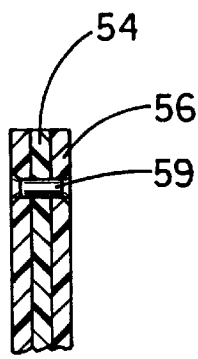
FIG. 11 is a cross-sectional view taken along line 11—11 in FIG. 10.
Figure 12:
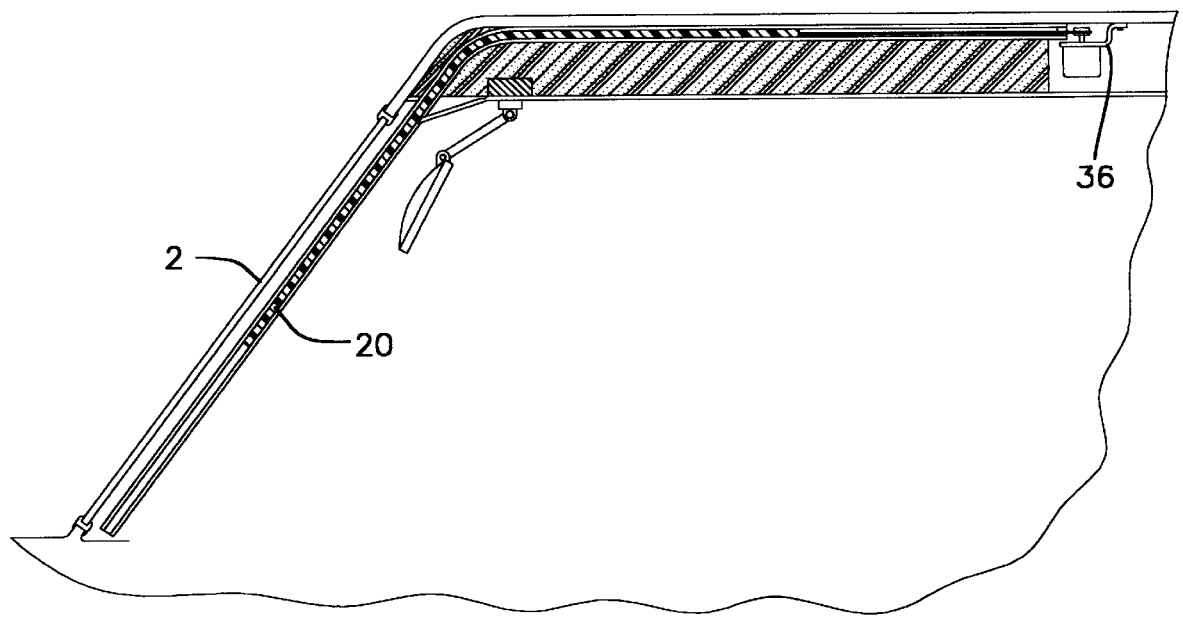
FIG. 12 is a cross-sectional view of an embodiment of the invention.

A generally U-shaped track 40 is designed for coupling to the vehicle around a portion of the window. The U-shaped track may employ lipped ends 74 as shown in FIG. 9 and may optionally include self lubricating spacer strips 76 to facilitate smooth operation of the device. The lining member is positioned within the track for facilitating placement of the lining member adjacent to the window such that the lining member is designed to cover the entirety of a window opening of the vehicle.

Each pulley system includes a cable 32 and a plurality of pulleys 34. The cable is formed into a loop around the pulleys. A reversible motor 36 is designed for rotating a drive pulley 38. The cable is wrapped around the drive pulley such that rotation of the drive pulley moves the loop around the pulleys. The lining member is coupled to the cable such that movement of the loop moves the lining member in the track between the extended and the retracted positions.

The lining members including a front lining member 50 having a central portion 52 and two side portions 56. Each side portion is positioned on a respective side of the central portion and is pivotally connected to the central portion by a rivet 59. The rivet is positioned proximate a top edge of the central portion.

Each side portion includes a plurality of spaced slits 57 extending inwardly from an edge of the side portion proximate the central portion for permitting curvature of the front lining member such that the front lining member is designed to generally conform to an interior surface of the front window of the vehicle. The slits further assist in providing full coverage of the area of the front window opening despite the common trapezoidal shape of the front window.

The central portion includes a pair of side flanges 54 extending outwardly from opposite sides of the central portion and the side portions each include a slot 55. A respective one of the side flanges is slidably inserted into each of the slots for aligning the side portions and the central portion while the front lining member is moving between the extended and the retracted positions. The rivets are each coupled to a respective one of the side flanges of the central portion.

Each lining member is coupled to the cable by a plurality of retaining tabs 24 extending from an outer peripheral edge of the lining member. Each tab includes a pair of holes 27 and 28 therein and the cable is extended through the holes. A first one of the holes 27 is structured to have a threaded aperture 62 extending orthogonally to the hole 27 from an outer surface of the tab into the first hole 27. A threaded screw 66 is positionable within the threaded aperture such that the screw is extendable into the first hole such that the screw engages the cable against a wall of the first hole whereby the cable is coupled to the tab. Thus movement of the cable urges the lining member to move also.

The second one of the holes 28 is structured such that the cable passes freely through the second hole when the lining member is moved between the extended and retracted positions. The second hole further serves to prevent tangling of the cable during use. Tabs on opposite sides of the lining member would have the first and second holes in opposite positions relative to the lining member to ensure that the cable moves the lining member in one direction. For example, the first hole must be the outside hole relative to the lining member on a first side of the lining member if the first hole of a tab on the opposite side of the lining member is the inside hole relative to the lining member.

In an embodiment, Each lining member includes an outer covering of a flexible cut resistant material, such as KEVLAR, to provide added protection while maintaining flexibility in the lining member.

The front lining member extends downwardly from a roof of the vehicle. In an embodiment, the front lining member is positioned in spaced relationship to the front window of the vehicle for preventing contact between a rear view mirror assembly and the front lining member when the front lining member is in the extended position and during movement of the front lining member between the extended and retracted positions. Also in an embodiment, the rear view mirror assembly is coupled to a top interior surface of the vehicle to permit the front lining member to be positioned immediately adjacent to the front window of the vehicle.

The motor is designed for coupling to the frame of the vehicle such that the motor is substantially centrally located along a base of the window shield system.

A switch 29 is provided for activating the reversible motor whereby the lining member is movable between the extended and retracted positions by manipulation of the switch. One switch may be operationally connected to the motor of a single or the motors of multiple lining members and multiple switches may be operationally connected to a motor for a single lining member as desired to provide maximum ability and convenience to position switches throughout the vehicle as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle window shield system for use in a vehicle having at least one window, the window being positionable within a window opening of the vehicle, wherein the vehicle includes a front window having a curvature, the vehicle window shield system comprising:
   at least one protective retractable lining member, each lining member being adapted for selective positioning adjacent to a respective window within the window opening of the vehicle such that the lining member provides a barrier between the window and an interior of the vehicle;
   each lining member having a pulley system operationally coupled thereto for facilitating movement of the lining member between an extended position defined by said lining member being positioned adjacent to the window and a retracted position defined by said lining member being positioned within a lining member chamber within the vehicle;
   a generally U-shaped track adapted for coupling to the vehicle around a portion of the window, said lining member being positioned within said track for facilitating placement of the lining member adjacent to the window such that said lining member is adapted to cover the entirety of a window opening of the vehicle;
   said lining members including a front lining member having a central portion and two side portions, each side portion being positioned on a respective side of said central portion;
   each side portion being pivotally connected to said central portion by a rivet, said rivet being positioned proximate a top edge of said central portion;
   each side portion having a plurality of spaced slits extending inwardly from an edge of said side portion proximate said central portion, said slits being for permitting curvature of said lining member such that said lining member is adapted to generally conform to an interior surface of the front window.

2. The window shield system of claim 1 wherein each lining member includes an outer covering of a flexible cut resistant material.

3. The window shield system of claim 1, further comprising:
   said central portion having a pair of side flanges extending outwardly from opposite sides of said central portion;
   said side portions each having a slot therein, a respective one of said side flanges being slidably inserted into each of said slots for aligning said side portions and said central portion while said front lining member is moving between said extended and said retracted positions.

4. The window shield system of claim 3 wherein said rivets are each coupled to a respective one of said side flanges of said central portion.

5. The window shield system of claim 1 wherein said front lining member extends downwardly from a roof of the vehicle; and
   wherein said front lining member is positioned in spaced relationship to the front window of the vehicle for preventing contact between a rear view mirror assembly and said front lining member when said front lining member is in the extended position and during movement of the front lining member between the extended and retracted positions.

6. The window shield system of claim 1, wherein the motor is adapted for coupling to the frame of the vehicle such that the motor is substantially centrally located along a base of the window shield system.

7. The window shield system of claim 1, further comprising:
   a switch for activating said reversible motor whereby said lining member is movable between said extended and retracted positions by manipulation of said switch.

8. A vehicle window shield system for use in a vehicle having at least one window, the window being positionable within a window opening of the vehicle, the vehicle window shield system comprising:
   at least one protective retractable lining member, each lining member being adapted for selective positioning adjacent to a respective window within the window opening of the vehicle such that the lining member provides a barrier between the window and an interior of the vehicle;

each lining member having a pulley system operationally coupled thereto for facilitating movement of the lining member between an extended position defined by said lining member being positioned adjacent to the window and a retracted position defined by said lining member being positioned within a lining member chamber within the vehicle;

a generally U-shaped track adapted for coupling to the vehicle around a portion of the window, said lining member being positioned within said track for facilitating placement of the lining member adjacent to the window such that said lining member is adapted to cover the entirety of a window opening of the vehicle;

wherein the pulley system comprises
  a cable;
  a plurality of pulleys, said cable being formed into a loop around said pulleys;
  a reversible motor for rotating a drive pulley, said cable being wrapped around said drive pulley such that rotation of said drive pulley moves said loop around said pulleys;
  said lining member being coupled to said cable such that movement of said loop moves said lining member between said extended and said retracted positions;

each said lining member being coupled to said cable by a plurality of retaining tabs extending from an outer peripheral edge of said lining member;

each tab having a pair of holes therein, said cable being extended through said holes, a first one of said holes being structured to have a threaded aperture extending orthogonally to said hole from an outer surface of said tab into said first hole;

a threaded screw, said threaded screw being positionable within said threaded aperture such that said screw is extendable into said first hole such that said screw engages said cable against a wall of said first hole whereby said cable is coupled to said tab; and a second one of said holes being structured such that said cable passes freely through said second hole when said lining member is moved between said extended and retracted positions.

9. The window shield system of claim 8 wherein each lining member includes an outer covering of a flexible cut resistant material.

10. The window shield system of claim 8, wherein the motor is adapted for coupling to the frame of the vehicle such that the motor is substantially centrally located along a base of the window shield system.

11. The window shield system of claim 8, further comprising:
  a switch for activating said reversible motor whereby said lining member is movable between said extended and retracted positions by manipulation of said switch.

12. A vehicle window shield system for use in a vehicle having at a front window having a curvature and at least one other window, the window being positioned within a window opening of the vehicle, the vehicle window shield system comprising:
  a plurality of protective retractable lining members, each lining member being adapted for selective positioning adjacent to a respective window within the window opening of the vehicle such that the lining member provides a barrier between the window and an interior of the vehicle;
  each lining member having a pulley system operationally coupled thereto for facilitating movement of the lining member between an extended position defined by said lining member being positioned adjacent to the window and a retracted position defined by said lining member being positioned within a lining member chamber within the vehicle;
  a generally U-shaped track adapted for coupling to the vehicle around a portion of the window, said lining member being positioned within said track for facilitating placement of the lining member adjacent to the window such that said lining member is adapted to cover the entirety of a window opening of the vehicle;
  wherein the pulley system comprises:
    a cable;
    a plurality of pulleys, said cable being formed into a loop around said pulleys;
    a reversible motor for rotating a drive pulley, said cable being wrapped around said drive pulley such that rotation of said drive pulley moves said loop around said pulleys;
    said lining member being coupled to said cable such that movement of said loop moves said lining member between said extended and said retracted positions;
  said lining members including a front lining member having a central portion and two side portions, each side portion being positioned on a respective side of said central portion;
  each side portion being pivotally connected to said central portion by a rivet, said rivet being positioned proximate a top edge of said central portion;
  each side portion having a plurality of spaced slits extending inwardly from an edge of said side portion proximate said central portion, said slits being for permitting curvature of said lining member such that said lining member is adapted to generally conform to an interior surface of the front window;
  each said lining member being coupled to said cable by a plurality of retaining tabs extending from an outer peripheral edge of said lining member;
  each tab having a pair of holes therein, said cable being extended through said holes, a first one of said holes being structured to have a threaded aperture extending orthogonally to said hole from an outer surface of said tab into said first hole;
  a threaded screw, said threaded screw being positionable within said threaded aperture such that said screw is extendable into said first hole such that said screw engages said cable against a wall of said first hole whereby said cable is coupled to said tab;
  a second one of said holes being structured such that said cable passes freely through said second hole when said lining member is moved between said extended and retracted positions;
  wherein each lining member includes an outer covering of a flexible cut resistant material;
  said central portion having a pair of side flanges extending outwardly from opposite sides of said central portion;
  said side portions each having a slot therein, a respective one of said side flanges being slidably inserted into each of said slots for aligning said side portions and said central portion while said front lining member is moving between said extended and said retracted positions;

wherein said rivets are each coupled to a respective one of said side flanges of said central portion;

wherein said front lining member extends downwardly from a roof of the vehicle;

wherein said front lining member is positioned in spaced relationship to the front window of the vehicle for preventing contact between a rear view mirror assembly and said front lining member when said front lining member is in the extended position and during movement of the front lining member between the extended and retracted positions;

wherein the motor is adapted for coupling to the frame of the vehicle such that the motor is substantially centrally located along a base of the window shield system; and a switch for activating said reversible motor whereby said lining member is movable between said extended and retracted positions by manipulation of said switch.

* * * * *